(12) United States Patent
Amano et al.

(10) Patent No.: US 7,963,657 B2
(45) Date of Patent: Jun. 21, 2011

(54) PROJECTION DISPLAY DEVICE

(75) Inventors: Ryuhei Amano, Hirakata (JP);
Michihiro Okuda, Hirakata (JP)

(73) Assignee: SANYO Electric Co., Ltd., Moriguchi (JP)

( * ) Notice: Subject to any disclaimer, the term of this patent is extended or adjusted under 35 U.S.C. 154(b) by 501 days.

(21) Appl. No.: 12/045,827

(22) Filed: Mar. 11, 2008

(65) Prior Publication Data
US 2008/0225237 A1 Sep. 18, 2008

(30) Foreign Application Priority Data
Mar. 16, 2007 (JP) ................................ 2007-069382

(51) Int. Cl.
| G03B 21/14 | (2006.01) |
| G03B 21/26 | (2006.01) |
| G02F 1/00 | (2006.01) |
| H04N 9/31 | (2006.01) |
| H04N 5/74 | (2006.01) |
| G02F 1/1347 | (2006.01) |
| G02F 1/1335 | (2006.01) |
| G02F 1/13 | (2006.01) |

(52) U.S. Cl. ............ 353/20; 353/34; 348/752; 348/762; 348/767; 349/80; 349/96; 349/194

(58) Field of Classification Search .......... 353/20, 353/34; 348/752, 762, 767; 349/80, 96, 349/194
See application file for complete search history.

(56) References Cited

U.S. PATENT DOCUMENTS

| 6,089,718 | A | 7/2000 | Hashizume |
| 6,798,580 | B2 * | 9/2004 | Ohishi et al. ............... 359/634 |
| 7,329,004 | B2 * | 2/2008 | Arai et al. .................... 353/8 |
| 2002/0060780 | A1 | 5/2002 | Takezawa et al. |
| 2004/0004769 | A1 | 1/2004 | Suzuki et al. |
| 2004/0017613 | A1 | 1/2004 | Ogawa |
| 2004/0027543 | A1 | 2/2004 | Ouchi et al. |
| 2004/0174582 | A1 | 9/2004 | Asakura |
| 2005/0117124 | A1 | 6/2005 | Hirata et al. |
| 2005/0280778 | A1 | 12/2005 | Kurioka |

(Continued)

FOREIGN PATENT DOCUMENTS

EP          1 480 075 A1   11/2004

(Continued)

OTHER PUBLICATIONS

Abstract translation of JP 01-126678 A.*

*Primary Examiner* — Georgia Y Epps
*Assistant Examiner* — Magda Cruz
(74) *Attorney, Agent, or Firm* — Marvin A. Motsenbocker; Mots Law, PLLC (57) ABSTRACT

An imager is shifted with respect to an optical axis of a refractive optical system. Thereby, a throw distance of a projector is shortened. A wavelength-selective half wavelength plate for rotating a polarization direction of green light beams is disposed between a dichroic prism and the refractive optical system in such a manner that the polarization direction of the green light beams is in parallel to the shifting direction. Thereby, the green light beams are incident onto the refractive optical system as P-polarized beams, whereby a transmittance of the green light beams in the refractive optical system is increased, while suppressing lowering of the light amount of the green light beams, and color non-uniformity resulting from lowering of the light amount of the green light beams.

5 Claims, 11 Drawing Sheets

U.S. PATENT DOCUMENTS

2006/0044516 A1 * 3/2006 Inoko .............................. 353/20
2006/0244920 A1   11/2006 Kawaai

FOREIGN PATENT DOCUMENTS

| JP | 64-011289 A1 | 1/1989 |
| JP | 01126678 A * | 5/1989 |
| JP | 2-90824 U | 7/1990 |
| JP | 05-100312 A1 | 4/1993 |
| JP | 09-318922 A1 | 12/1997 |
| JP | H10-186548 A | 7/1998 |
| JP | 2000-098322 A1 | 4/2000 |
| JP | 2003-121811 A | 4/2003 |
| JP | 2004-258620 A1 | 9/2004 |
| JP | 2005-352078 A | 12/2005 |

* cited by examiner

PROJECTION DISPLAY DEVICE

This application claims priority under 35 U.S.C. Section 119 of Japanese Patent Application No. 2007-069382 filed Mar. 16, 2007, entitled "PROJECTION DISPLAY DEVICE".

BACKGROUND OF THE INVENTION

1. Field of the Invention

The present invention relates to a projection display device for projecting an image on an imager (a beam modulating element) onto a projection plane, and more particularly to a projection display device for enlarging and projecting projection light in an oblique direction.

2. Description of the Related Art

There has been commercialized and widely spread a projection display device (hereinafter, called as "projector") for enlarging and projecting an image on an imager such as a liquid crystal panel onto a projection plane such as a screen. For instance, this sort of projectors have an arrangement that three transmissive liquid crystal panels as imagers are used, red, green, and blue light beams are modulated by the respective panels, and the modulated light beams are synthesized by a dichroic prism for projection onto a screen plane by a projection optical system.

For this sort of projectors, there is proposed a method for enhancing light use efficiency, considering transmittance (reflectance) characteristics of a dichroic prism with respect to a polarization direction. Specifically, an optical component for converting a polarization direction is disposed between a liquid crystal panel and a dichroic prism. With use of the optical component, green light beams transmitted through the dichroic prism are converted into P-polarized beams for incidence onto the dichroic prism; and red and blue light beams reflected on a dichroic mirror are converted into S-polarized beams for incidence onto the dichroic prism. Thus, by controlling the polarization direction of the light beams of the respective colors, the amount of light transmitted through the dichroic prism is increased.

As another type of the projector, there is also proposed an oblique projection type projector constructed in such a manner that a wide-angle projection optical system is used, and the propagating direction of projection light is tilted with respect to an optical axis of the projection optical system to shorten the distance between a screen and a projector main body.

For instance, there is proposed an arrangement of the oblique projection type projector constructed in such a manner that a wide-angle lens having a large angle of view is used as a projection optical system, and an imager and a screen are shifted in directions opposing to each other with respect to an optical axis of the projection optical system. Thereby, oblique projection is realized, while securing a shortened throw distance, and eliminating a distortion.

In another arrangement of oblique projection, a refractive optical system and a reflection plane are used as a projection optical system, an image on an imager is formed as an intermediate image at a position between the refractive optical system and the reflection plane, and the intermediate image is enlarged and projected by the reflection plane. Thereby, shortening the throw distance is realized.

In the aforementioned arrangements, a trapezoidal distortion may occur in a projected image, resulting from oblique projection. The trapezoidal distortion, however, can be suppressed by shifting the imager with respect to the optical axis of the projection optical system.

The throw distance can be shortened while enhancing light use efficiency, by combining the aforementioned oblique projection arrangements with the aforementioned arrangement of controlling the polarization direction with respect to each of the colors. In the above combined arrangement, it is necessary to shift the imager with respect to the optical axis of the projection optical system to suppress a trapezoidal distortion.

In the case where the imager is shifted, the light amount of a specific color may be seriously lowered, as a projection beam is moved from one end of a projection area toward the other end of the projection area. As a result, color non-uniformity may occur in a displayed image. The lowering of light amount and generation of color non-uniformity are remarkable, as the shift amount of the imager with respect to the optical axis of the projection optical system is increased.

Assuming that green light beams are projected onto a screen as P-polarized beams, and red and blue light beams are projected onto the screen as S-polarized beams, as described above, if the screen is a polarization screen for preventing contrast lowering, merely the beams of a specific color are reflected on the screen, which may obstruct display of a proper color image.

The aforementioned drawback may be suppressed by arranging a quarter wavelength plate on the exit side of a projection lens, for example. In the above arrangement, green light beams, and red and blue light beams emitted from the projection lens are converted into circularly polarized beams having different rotation directions by the quarter wavelength plate. Guiding the light beams of the respective colors to the screen as circularly polarized beams enables to uniformly reflect the light beams of the respective colors on a polarization screen, even if the screen is the polarization screen. Thus, a proper color image can be displayed on the screen.

The above arrangement, however, fails to suppress lowering the light amount of a specific color, resulting from shifting the imager with respect to the optical axis of the projection optical system, and generation of color non-uniformity resulting from lowering the light amount of a specific color.

SUMMARY OF THE INVENTION

The inventors of the present application have investigated, in developing a projection display device of oblique projection type, an approach of shortening a throw distance, while suppressing a trapezoidal distortion resulting from shifting an imager. As a result of the investigation, the inventors have confirmed a phenomenon that the light amount of a specific color is significantly lowered depending on shift of the imager, as a projection beam is moved from one end of a projection area toward the other end of the projection area, and that a displayed image has color non-uniformity resulting from lowering of the light amount of a specific color. The inventors have also confirmed that lowering of the light amount and color non-uniformity are remarkable, as the shift amount of the imager with respect to the optical axis of the projection optical system is increased.

The inventors of the present application have intensively investigated to overcome the aforementioned drawbacks while securing a shortened throw distance. As a result of analysis/investigation of the aforementioned drawbacks, the inventors have found a possibility that there may be a relation between lowering of the light amount of a specific color and color non-uniformity, and a polarization state of the light beam of the specific color. Based on the finding, the inventors have analyzed/investigated the relation between the polarization direction and the lowering of the light amount, and concluded that the lowering of the light amount and color non-uniformity can be eliminated by approximating the polarization direction of the light beam to the direction of shifting the imager with respect to the optical axis of the projection optical system.

The present invention has been made based on the above investigation/analysis and conclusion.

A projection display device according to a first aspect of the invention comprises: a light source; a plurality of imagers each arranged in correspondence to a light beam in a wavelength band to be modulated; a light synthesizing element for synthesizing the light beams in the wavelength bands modulated by the imagers; a first polarization regulating element for converting the light beam in one of the wavelength bands into a linearly polarized beam having a polarization direction orthogonal to a polarization direction of the light beam in the other wavelength band for incidence onto the light synthesizing element; a projection optical system for enlarging and projecting light synthesized by the light synthesizing element; and a second polarization regulating element disposed between the light synthesizing element and the projection optical system, wherein each of the imagers is disposed in a state that a center of the each imager is optically shifted with respect to an optical axis of the projection optical system, and the second polarization regulating element regulates the polarization direction of the light beam in a predetermined wavelength band among the light beams in the wavelength bands in such a manner that the polarization direction of the light beam in the predetermined wavelength band is approximated to a shifting direction of the center of the corresponding imager with respect to the optical axis of the projection optical system.

In the arrangement of the first aspect of the invention, the polarization direction of the light beam in the predetermined wavelength band to be incident onto the projection optical system is approximated to the shifting direction of the imager with respect to the optical axis of the projection optical system. Accordingly, lowering of the light amount of the light beam in the predetermined wavelength band, and color non-uniformity can be suppressed.

A projection display device according to a second aspect of the invention comprises: a light source; a plurality of imagers each arranged in correspondence to a light beam in a wavelength band to be modulated; a light synthesizing element for synthesizing the light beams in the wavelength bands modulated by the imagers; a first polarization regulating element for converting the light beam in one of the wavelength bands into a linearly polarized beam having a polarization direction orthogonal to a polarization direction of the light beam in the other wavelength band for incidence onto the light synthesizing element; a projection optical system for enlarging and projecting light synthesized by the light synthesizing element; and a second polarization regulating element disposed between the light synthesizing element and the projection optical system, wherein each of the imagers is disposed in a state that a center of the each imager is optically shifted with respect to an optical axis of the projection optical system, and the second polarization regulating element regulates a polarization condition of the light beam in a predetermined wavelength band among the light beams in the wavelength bands in such a manner that the light beam in the predetermined wavelength band is converted into a circularly polarized beam.

In the arrangement according to the second aspect of the invention, the light beam in the predetermined wavelength band is incident onto the projection optical system as the circularly polarized beam. Thereby, lowering of the light amount of the light beam in the predetermined wavelength band, and color non-uniformity can be suppressed, as well as the arrangement of the first aspect. The arrangement of the second aspect will be described in the section of the embodiment, referring to FIG. 10.

BRIEF DESCRIPTION OF THE DRAWINGS

The foregoing and other objectives and novel features of the present invention will be more fully understood by reading description of a preferred embodiment in combination with the attached drawings as follows.

The drawings are provided mainly for describing the present invention, and do not limit the scope of the present invention.

DESCRIPTION OF PREFERRED EMBODIMENTS

Figure 1:
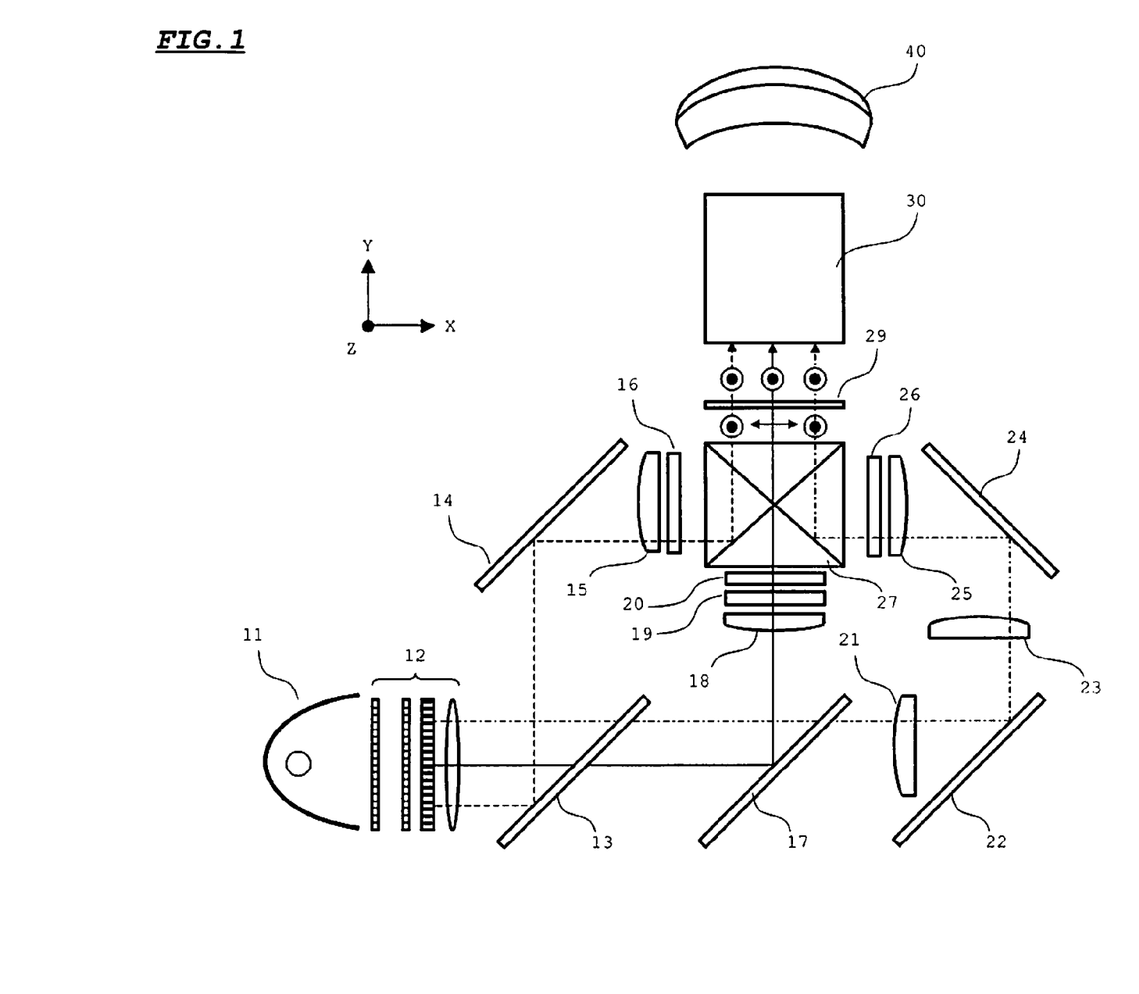
FIG. 1 is a diagram showing an optical system of a projector embodying the invention.

In the following, an embodiment of the invention is described referring to the drawings. FIG. 1 shows an optical system of a projector embodying the invention.

Referring to FIG. 1, a light source 11 includes a lamp and a reflector, and emits approximately parallel beams to an illumination optical system 12. The illumination optical system 12 includes a fly-eye integrator, a PBS (polarized beam splitter) array, and a condenser lens. The illumination optical system 12 is adapted to make light amount distributions of light beams of respective colors to be incident onto imagers i.e. liquid crystal panels 16, 19, and 26 uniform, and to align polarization directions of the light beams directed toward a dichroic mirror 13 in Z-axis direction shown in FIG. 1.

The dichroic mirror 13 reflects solely light beams (hereinafter, called as "B beams") in a wavelength band corresponding to blue, and transmits light beams (hereinafter, called as "R beams") in a wavelength band corresponding to red, and light beams (hereinafter, called as "G beams") in a wavelength band corresponding to green, among the light beams emitted from the illumination optical system 12. A mirror 14 reflects the B beams reflected on the dichroic mirror 13 in a direction toward a condenser lens 15.

The condenser lens 15 imparts a lens function to the B beams in such a manner that the B beams are incident onto the imager 16 as parallel beams. The imager 16 is driven based on a video signal for blue color, and modulates the B beams depending on a driving condition of the imager 16. A polarizing plate (not shown) is provided on each of an incident side and an exit side of the imager 16.

A dichroic mirror 17 reflects solely the G beams among the R beams and the G beams transmitted through the dichroic mirror 13. A condenser lens 18 imparts a lens function to the G beams in such a manner that the G beams are incident onto the imager 19 as parallel beams. The imager 19 is driven based on a video signal for green color, and modulates the G beams depending on a driving condition of the imager 19. A polarizing plate (not shown) is provided on each of an incident side and an exit side of the imager 19.

A half wavelength plate 20 rotates the polarization direction of the G beams by 90 degrees. Thereby, the polarization direction of the G beams is aligned in X-axis direction shown in FIG. 1.

Relay lenses 21 and 23 each imparts a lens function to the R beams in such a manner that the incident state of the R beams onto the imager 26 coincides with the incident states of the B beams and the G beams onto the imagers 16 and 19. Mirrors 22 and 24 each changes the optical path of the R beams in such a manner that the R beams transmitted through the dichroic mirror 17 are guided to the imager 26.

A condenser lens 25 imparts a lens function to the R beams in such a manner that the R beams are incident onto the imager 26 as parallel beams. The imager 26 is driven based on a video signal for red color, and modulates the R beams depending on a driving condition of the imager 26. A polarizing plate (not shown) is provided on each of an incident side and an exit side of the imager 26.

A dichroic prism 27 reflects the B beams and the R beams, and transmits the G beams, among the B beams, the G beams, and the R beams which have been modulated by the imagers 16, 19, and 26, respectively, to color-synthesize the B beams, the G beams, and the R beams. The B beams and the R beams are incident onto a reflection plane of the dichroic prism 27 as S-polarized beams, and the G beams are incident onto the reflection plane of the dichroic prism 27 as P-polarized beams.

A wavelength-selective half wavelength plate 29 rotates the polarization direction of solely the G beams by 90 degrees, among the light beams to be incident from the dichroic prism 27. Thereby, the B beams, the G beams, and the R beams are incident onto a refractive optical system 30 as linearly polarized beams whose polarization directions are aligned in Z-axis direction shown in FIG. 1.

The refractive optical system 30 includes lenses for forming projection light on an intermediate image forming plane, and an actuator for displacing a part of the lenses in an optical axis direction to control a focusing state of a projected image. A reflection mirror section 40 includes an aspherical mirror or a free curved mirror, and is adapted to project projection light incident from the refractive optical system 30 as wide-angle light onto a projection plane as a screen plane. The refractive optical system 30 and the reflection mirror section 40 constitute a projection optical system.

Figure 2:
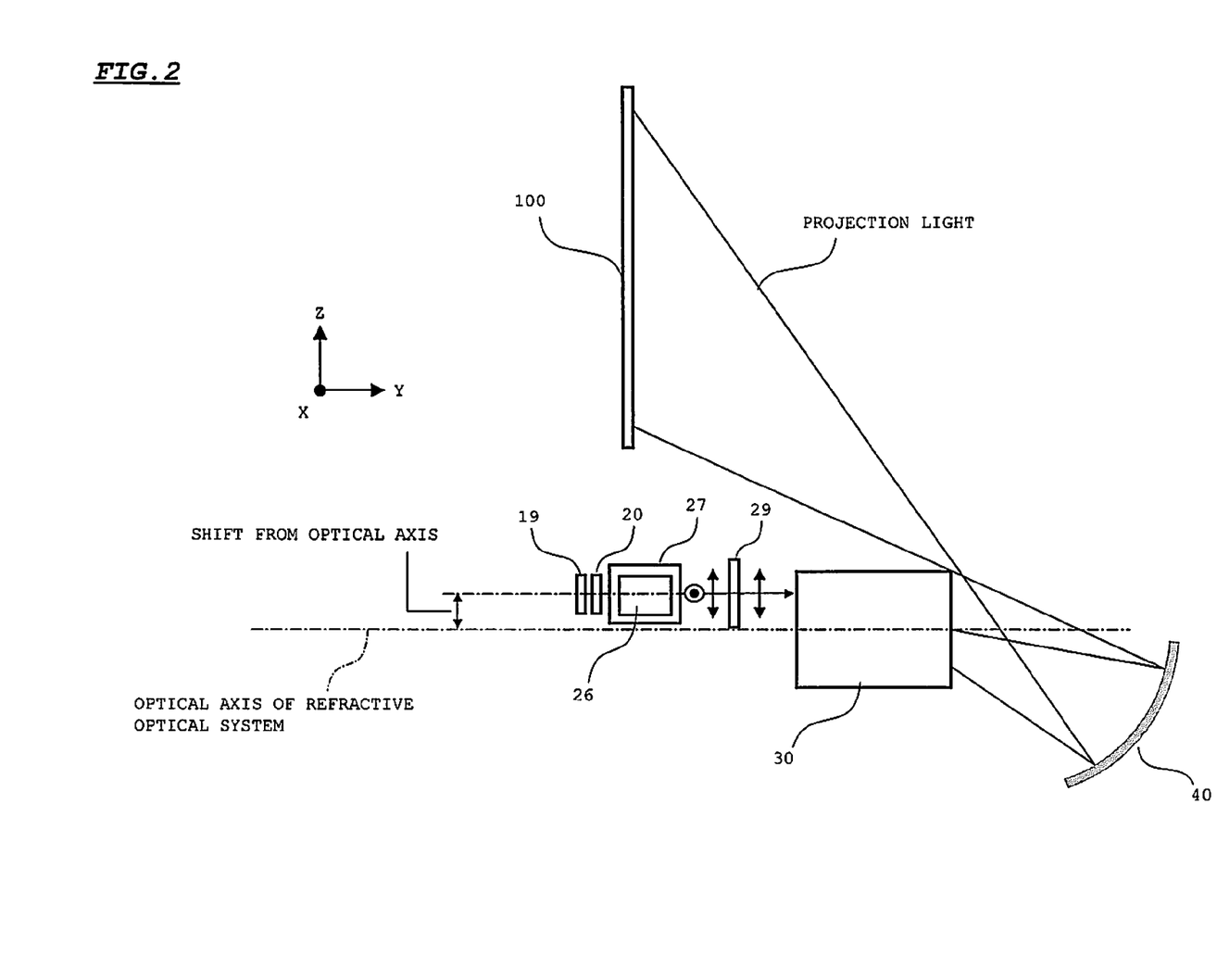
FIG. 2 is a diagram for describing a positional relation between a refractive optical system and imagers in the embodiment.

FIG. 2 shows a positional relation between the refractive optical system 30, and the imagers 16, 19 and 26. The imager 16 is arranged on the rear side of the dichroic prism 27 in X-axis direction in FIG. 2.

As shown in FIG. 2, in the embodiment, the imagers 16, 19, and 26 corresponding to the respective colors are arranged in a state that the imager 16 (19, 26) is shifted in Z-axis direction by a distance equal to or larger than ½ of the vertical size of the imager 16 (19, 26) with respect to the optical axis of the refractive optical system 30 to secure a shortened throw distance and suppress a trapezoidal distortion in an oblique projection arrangement. In the embodiment, as described above, the polarization direction of the G beams to be incident onto the refractive optical system 30 is aligned in Z-axis direction by the function of the wavelength-selective half wavelength plate 29. Accordingly, all the polarization directions of the B beams, the G beams, and the R beams are aligned in a direction i.e. Z-axis direction along which the imagers 16, 19, and 26 are shifted with respect to the optical axis of the refractive optical system 30. Thus, the light beams of the respective colors are incident onto a tangential plane of each of the lenses in the refractive optical system 30 in a P-polarized condition.

In the embodiment, lowering of the light amount of the G beams is suppressed by controlling the polarization direction of the G beams as described above. In the following, the above feature is described in contrast with a comparative example where the wavelength-selective half wavelength plate 29 is not disposed.

Figure 3:
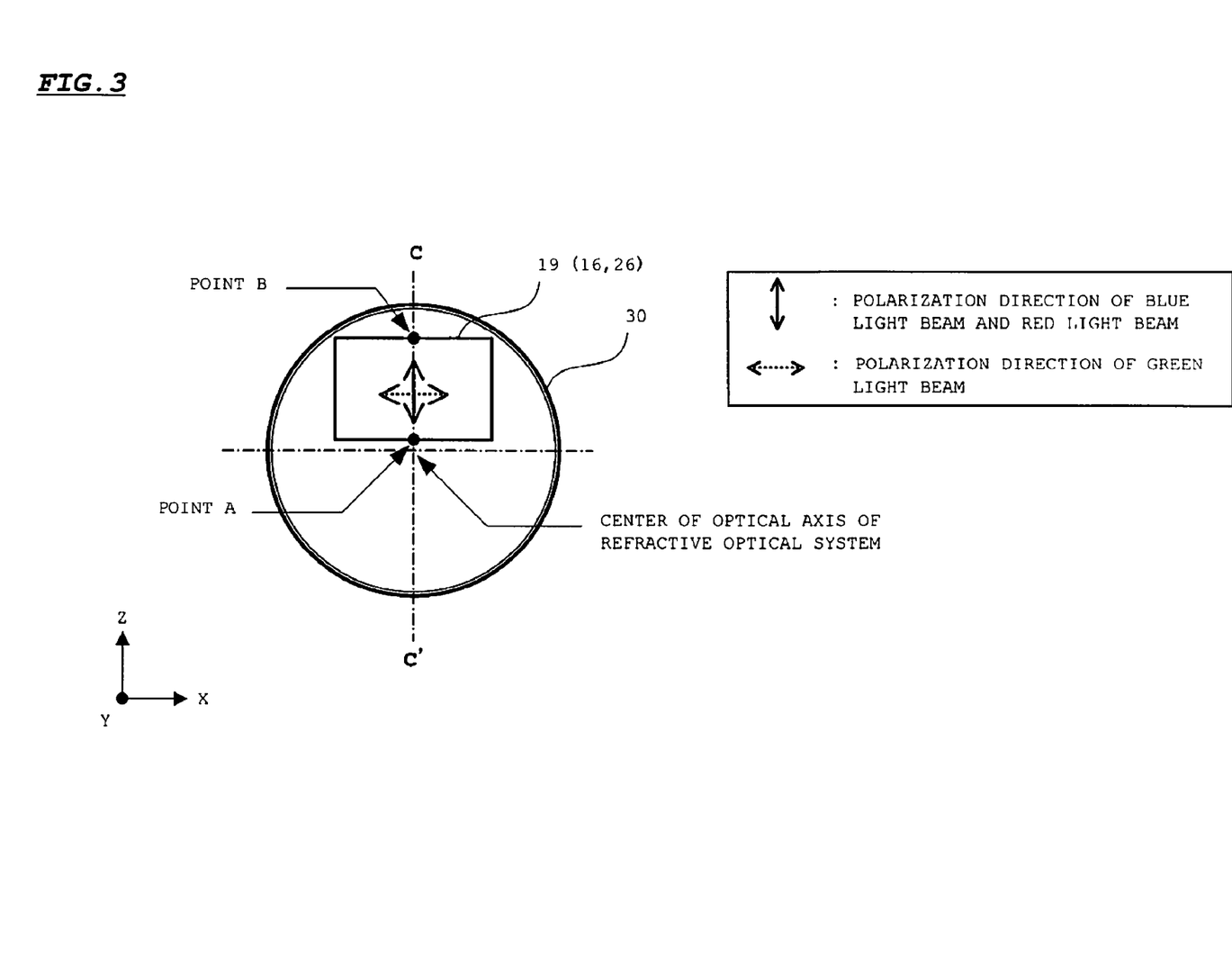
FIG. 3 is a diagram showing polarization directions of light beams of respective colors in a comparative example where a wavelength-selective half wavelength plate is not disposed.

FIG. 3 shows polarization directions of light beams of the respective colors, in a comparative example where the wavelength-selective half wavelength plate 29 is not disposed. In the arrangement of FIG. 3, G beams are incident onto the refractive optical system 30, with an oscillating polarization direction i.e. X-axis direction perpendicular to the direction of shifting the imager 19. B beams and R beams are incident onto the refractive optical system 30 with an oscillating polarization direction i.e. Z-axis direction identical to the direction of shifting the imagers 16 and 26.

Figure 4:
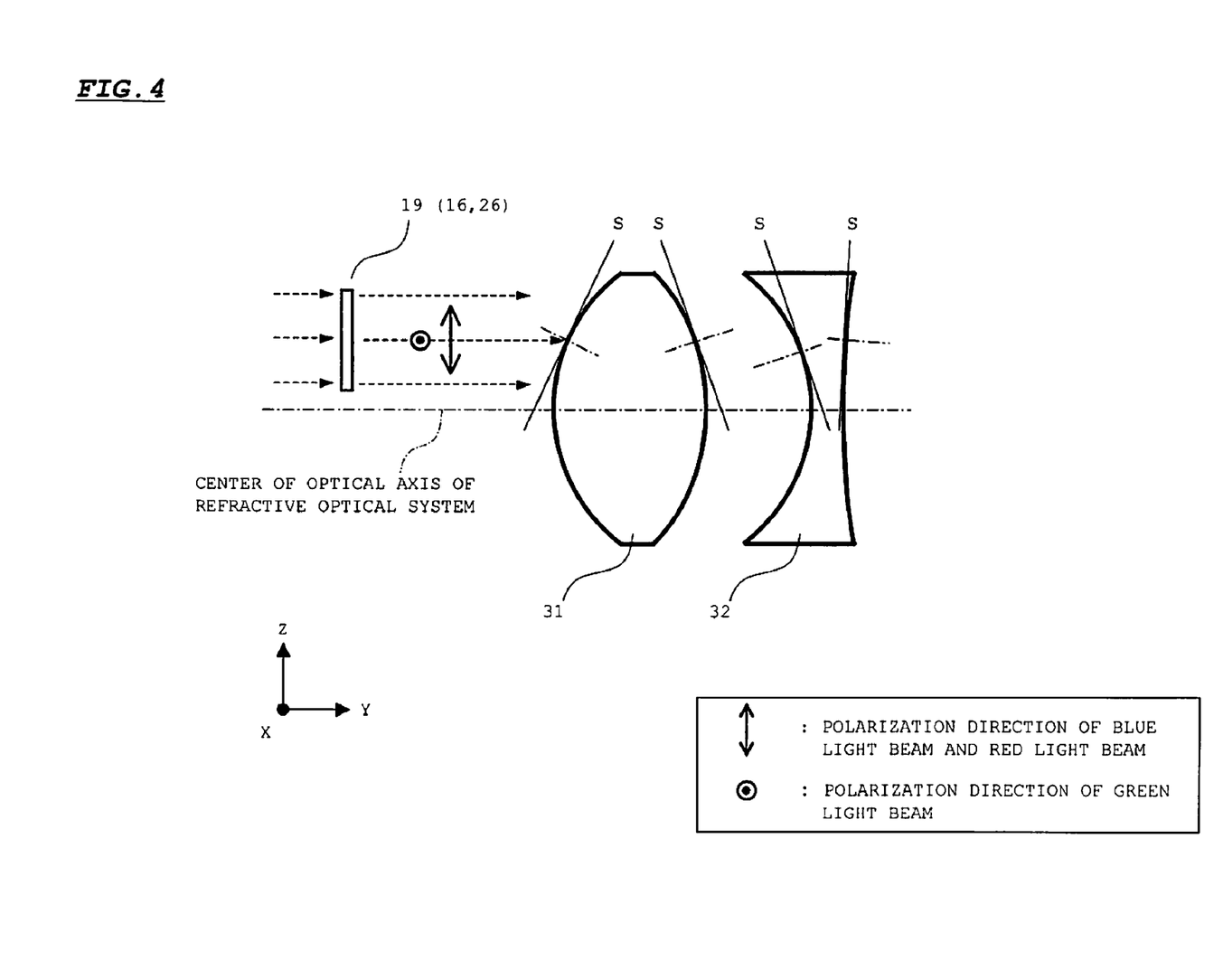
FIG. 4 is a diagram showing a state that light beams of the respective colors are incident onto a lens in the comparative example where the wavelength-selective half wavelength plate is not disposed.

FIG. 4 is a partially cross-sectional view taken along the line C-C' in FIG. 3. In the comparative example, as described above, the imager 16 (19, 26) is shifted in Z-axis direction with respect to the optical axis of the refractive optical system 30. Accordingly, light beams incident and exit perpendicularly to a display plane of the imager 16 (19, 26) primarily pass a periphery of lenses 31 and 32.

Figure 5:
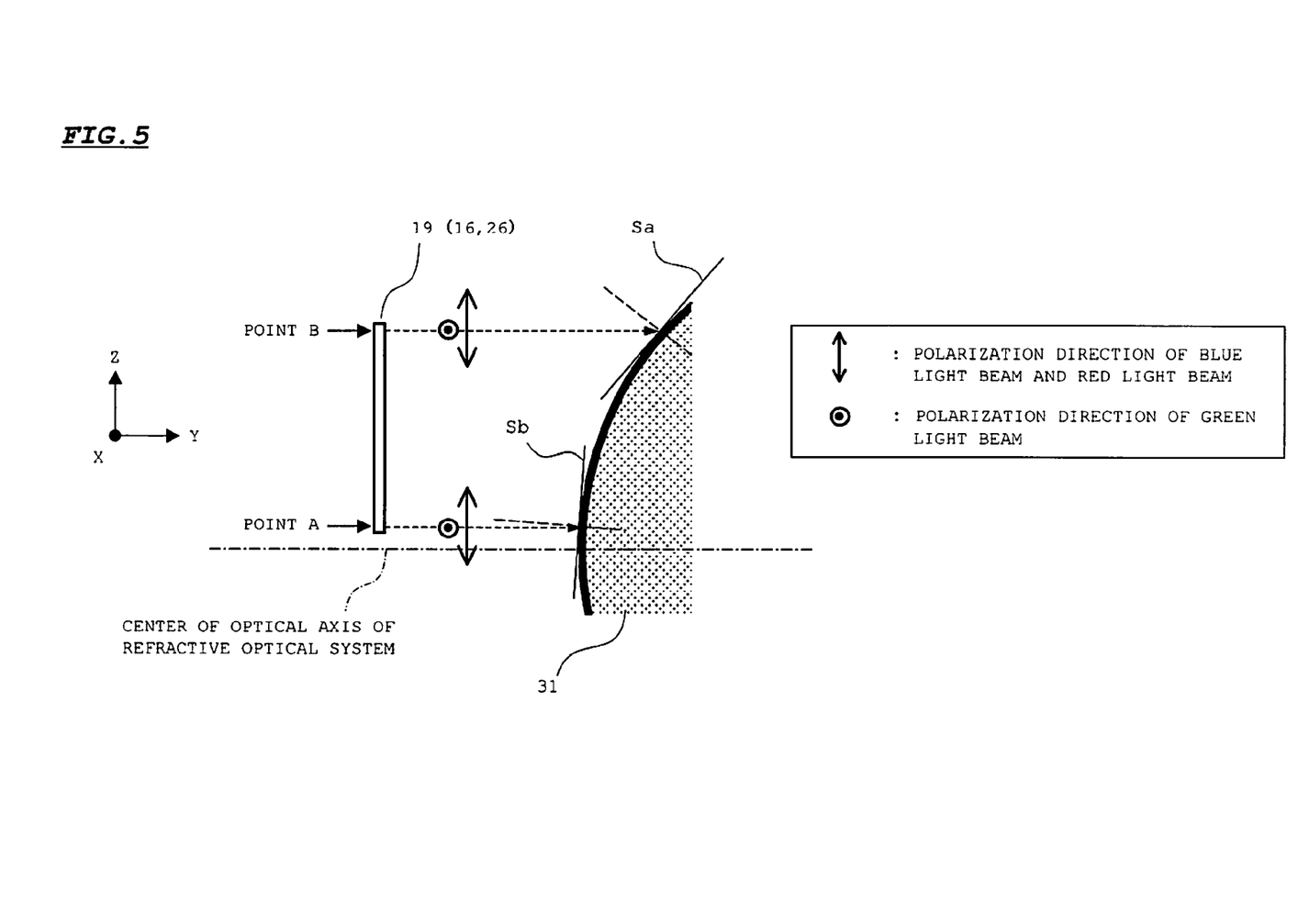
FIG. 5 is a diagram showing a state that light beams of the respective colors are incident onto the lens in the comparative example where the wavelength-selective half wavelength plate is not disposed.

Light beams exiting perpendicularly to the display plane of the imager 16 (19, 26) at individual points of the imager 16 (19, 26) e.g. points A and B in FIG. 3 are incident onto tangential planes S of the lenses 31 and 32 with different angles. FIG. 5 is a diagram showing a relation between tangential planes Sa and Sb and an incident angle, in the case where the light beams having the above incidence behavior are incident onto the lens 31. The G beams are S-polarized beams i.e. linearly polarized beams in X-axis direction with respect to each of the tangential planes S, and the B beams and the R beams are P-polarized beams i.e. linearly-polarized beams in Z-axis direction with respect to each of the tangential planes S. Accordingly, the transmittance of light beams of the respective colors is different depending on the incident angle of the light beams of the respective colors with respect to each of the tangential planes S, and the polarization direction thereof.

A reflectance and a transmittance in the case where light is incident from a medium 1 having a refractive index n1 to a medium 2 having a refractive index n2 are given by the following mathematical expressions (1) and (2), respectively.

Reflectance: 1

$E \parallel$ incident plane (P-polarized beam)

$$Rp = \left(\frac{n^2\cos\phi_1 - \sqrt{(n^2 - \sin^2\phi_1)}}{n^2\cos\phi_1 + \sqrt{(n^2 - \sin^2\phi_1)}}\right)^2$$

$E \perp$ incident plane (S-polarized beam)

$$Rs = \left(\frac{\cos\phi_1 - \sqrt{(n^2 - \sin^2\phi_1)}}{\cos\phi_1 + \sqrt{(n^2 - \sin^2\phi_1)}}\right)^2$$

where $n = n_2/n_1$.

Transmittance: 2

$E \parallel$ incident plane (P-polarized beam)

$$Tp = \frac{4n^2\cos\phi_1\sqrt{(n^2 - \sin^2\phi_1)}}{\left(n^2\cos\phi_1 + \sqrt{(n^2 - \sin^2\phi_1)}\right)^2}$$

$E \perp$ incident plane (S-polarized beam)

$$Ts = \frac{4\cos\phi_1\sqrt{(n^2 - \sin^2\phi_1)}}{\left(\cos\phi_1 + \sqrt{(n^2 - \sin^2\phi_1)}\right)^2}$$

where $n = n_2/n_1$.

In the above expressions, $\phi_1$ and $\phi_2$ are respectively an incident angle and a refractive angle of light to be incident from the medium 1 to the medium 2; $R_P$ and $R_S$ are respectively reflectances of light in the case where the light is incident onto an incident plane i.e. a boundary surface between the medium 1 and the medium 2 as a P-polarized beam and an S-polarized beam; and $T_P$ and $T_S$ are respectively transmittances of light in the case where the light is incident onto the incident plane i.e. the boundary surface between the medium 1 and the medium 2 as a P-polarized beam and an S-polarized beam.

Figure 6A:
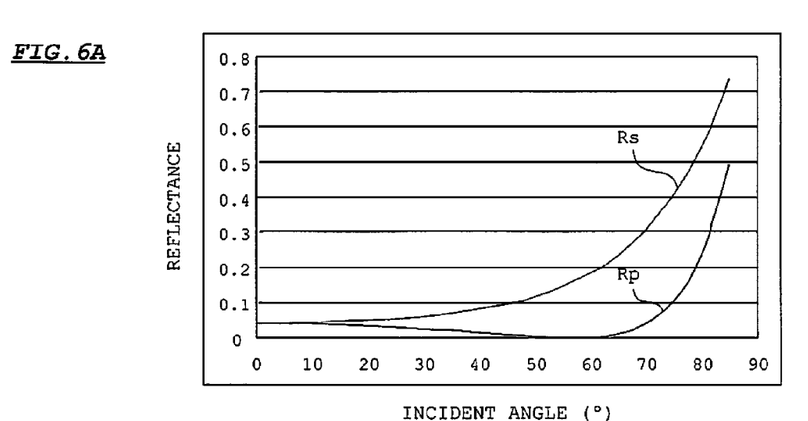
FIG. 6A is a graph showing relations between an incident angle of P-polarized beams and S-polarized beams with respect to an incident plane, and a reflectance.
Figure 6B:
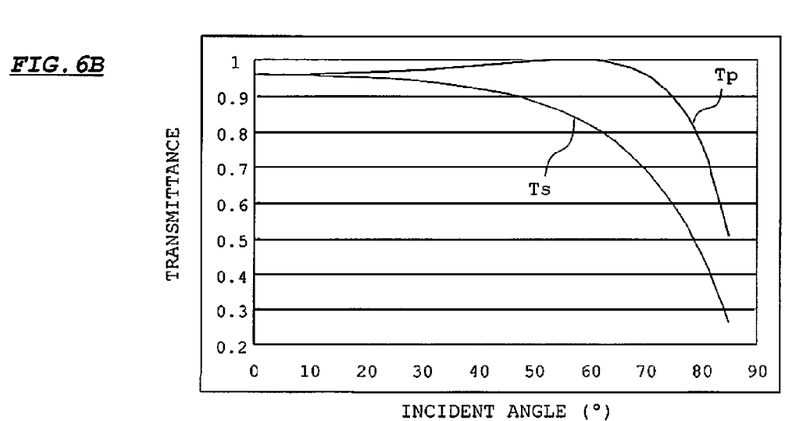
FIG. 6B is a graph showing relations between an incident angle of P-polarized beams and S-polarized beams with respect to an incident plane, and a transmittance.

FIGS. 6A and 6B are graphs respectively showing a change in reflectance and transmittance in the case where light is incident from the air to an optical glass BK7 whose refractive index is 1.5168. As shown in FIGS. 6A and 6B, the transmittance of light changes depending on an incident angle of light with respect to an incident plane, and a polarization direction of light. Accordingly, the transmittance of B beams, G beams, and R beams with respect to the refractive optical system 30 changes depending on an incident angle of light beams of the respective colors with respect to each of the tangential planes S of the lenses provided in the refractive optical system 30, and a polarization direction of light beams of the respective colors.

Since B beams, G beams, and R beams have different wavelengths from each other, refractive indexes of the B beams, the G beams, and the R beams with respect to each of the lenses in the refractive optical system 30 are different from each other. Accordingly, a refractive function of each of the lenses with respect to the B beams, G beams, and the R beams is different from each other. As a result, the light beams of the respective colors propagate along optical paths in the refractive optical system 30 different from each other. Accordingly, the incident angle $\phi_1$ of the light beams of the respective colors is different from each other with respect to each of the lenses. Therefore, the transmittance of the light beams with respect to each of the lenses is different with respect to each of the colors. Since a difference in refractive index affects the parameter "n" in the above mathematical expression, the transmittances of the light beams of the respective colors with respect to each of the lenses are also different from each other depending on the refractive index difference.

Figure 7:
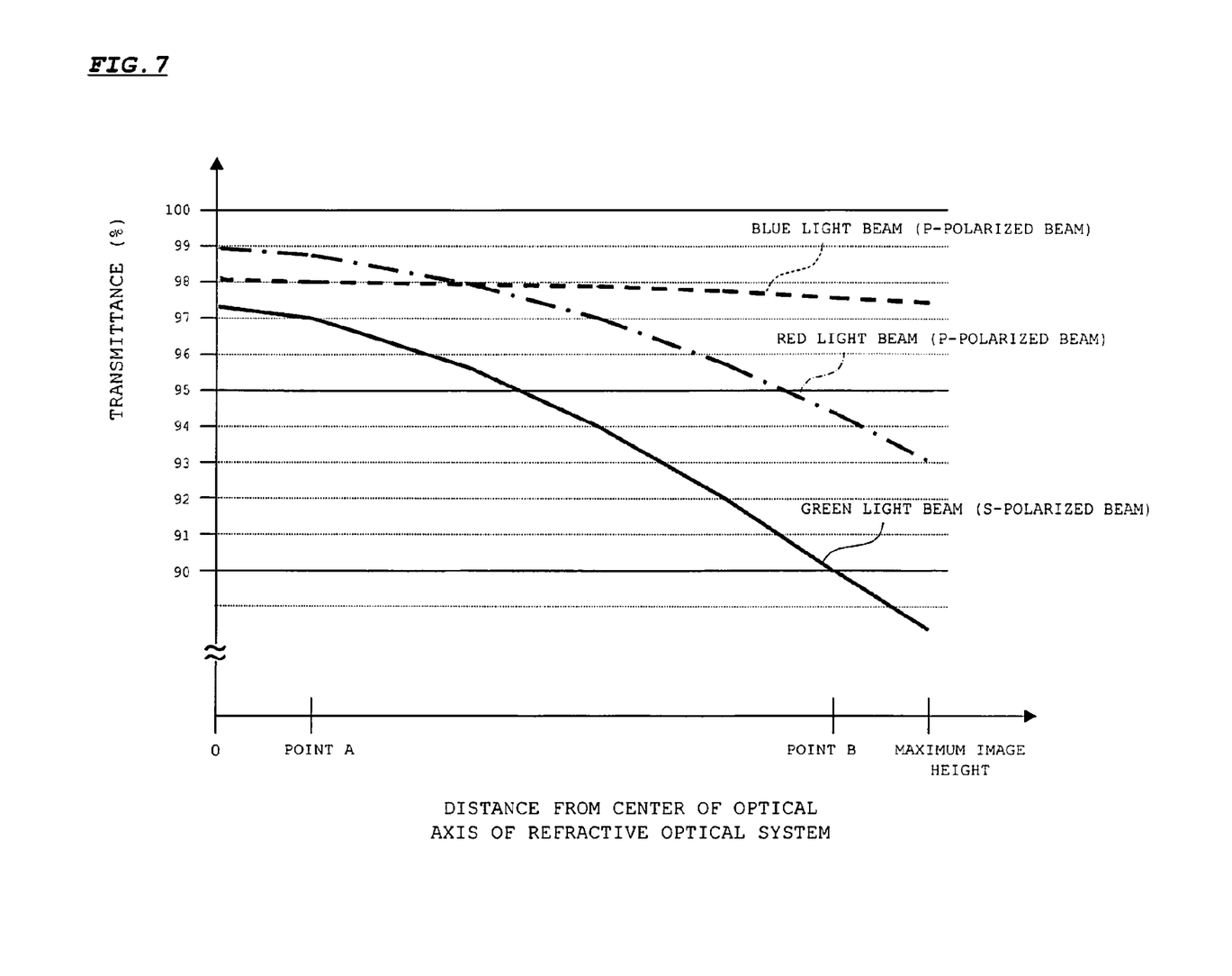
FIG. 7 is a simulation graph showing relations between a distance from an optical axis of the refractive optical system, and a transmittance of light beams of the respective colors, in the case where blue and red light beams are incident onto the refractive optical system as P-polarized beams, and green light beams are incident onto the refractive optical system as S-polarized beams, in a condition that a wavelength-selective half wavelength plate is not disposed.

FIG. 7 is a simulation graph showing relations between a distance from an optical axis of the refractive optical system 30 to a beam passing position on the line c-c' in FIG. 3 in a display plane of the imager 16 (19, 26), and a transmittance of light beams of the respective colors, in the case where the wavelength-selective half wavelength plate 29 is not disposed. The simulation is obtained by calculating the sum of transmittances to be obtained in the case where the light beams of the respective colors are transmitted through all the lenses provided in the refractive optical system 30 based on optical design values of the lenses.

As shown in FIG. 7, as the beam passing position in the display plane is distanced from the center of the optical axis, the transmittance of the G beams is significantly lowered, as compared with the B beams and the R beams. The above phenomenon occurs because the G beams are S-polarized beams with respect to the tangential planes of the lenses, and the B beams and the R beams are P-polarized beams with respect to the tangential planes of the lenses. Although the R beams are P-polarized beams with respect to the tangential planes of the lenses, the transmittance of the R beams is lowered, as compared with the B beams, because of a wavelength characteristic of the R beams. The lowering of transmittance of the R beams, however, can be suppressed to some extent by adjusting an optical design of the lenses in the refractive optical system 30.

As described above, under the simulation condition shown in FIG. 7, a G beam perpendicularly exiting from the imager at the point B (see FIG. 3) has a significantly lowered transmittance, as compared with a G beam exiting from the imager at the point A. Also, the transmittance of an R beam exiting from the imager at the point B is significantly lowered than the transmittance of an R beam exiting from the imager at the point A. As a result, a projected image on a screen may have color non-uniformity.

Figure 8:
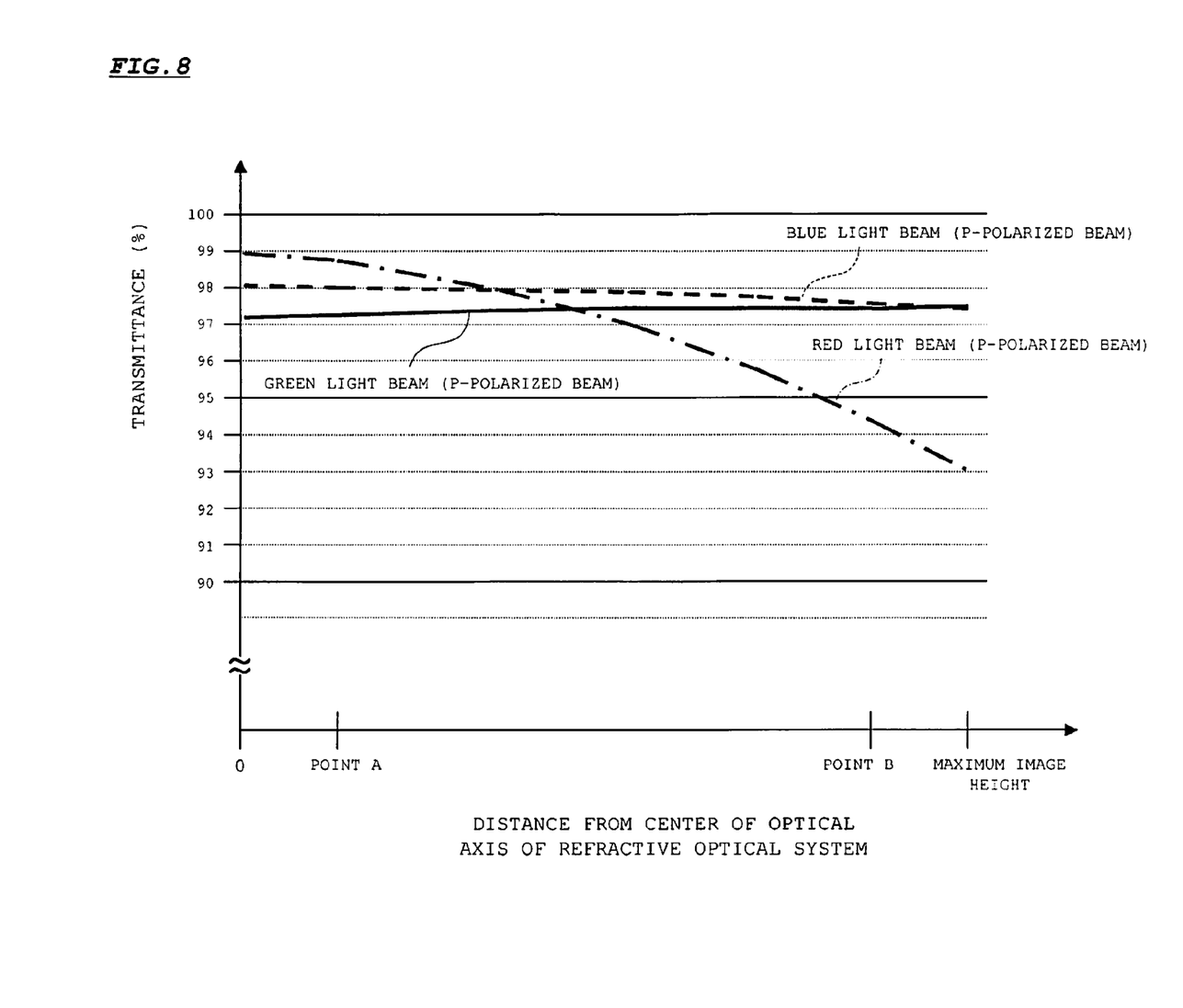
FIG. 8 is a simulation graph showing relations between a distance from the optical axis of the refractive optical system, and a transmittance of light beams of the respective colors, in the case where blue, green, and red light beams are incident onto the refractive optical system as P-polarized beams, in a condition that a wavelength-selective half wavelength plate is disposed.

FIG. 8 is a simulation graph showing relations between a distance from the optical axis of the refractive optical system 30 to a beam passing position on the line c-c' in FIG. 3 in the display plane of the imager 16 (19, 26), and a transmittance of light beams of the respective colors, in the case where the wavelength-selective half wavelength plate 29 is disposed, as shown in the embodiment, under the same condition as in FIG. 7.

As is obvious from FIG. 8, in the embodiment, G beams are incident onto the refractive optical system 30 in a P-polarized condition by the function of the wavelength-selective half wavelength plate 29. Accordingly, the transmittance of the G beams is remarkably increased, as compared with the example shown in FIG. 7. Under the above simulation condition, a G beam perpendicularly exiting from the imager at the point B has substantially no transmittance difference, as compared with a G beam exiting from the imager at the point A. Accordingly, the embodiment is advantageous in effectively suppressing color non-uniformity resulting from lowering of the light amount of G beams.

In the current technology, the projection light amount of G beams is significantly larger than the projection light amounts of B beams and R beams among the B beams, G beams, and the R beams. Accordingly, color non-uniformity in a projected image is most greatly affected by a transmittance difference or lowering of the light amount of G beams. In view of the above, suppressing a transmittance difference of G beams as recited in the embodiment enables to significantly suppress color non-uniformity in a projected image.

In the foregoing embodiment, description is made concerning light beams perpendicularly exiting from a display plane of a imager to simplify the description. In an actual operation, illumination light exits from a display plane of a imager with a certain dispersion angle. Accordingly, in a strict sense, it is necessary to investigate a light flux having a certain dispersion angle, as well as light beams perpendicularly exiting from a display plane. However, a light flux having a certain dispersion angle is substantially equivalent to light beams perpendicularly exiting from a display plane in the aspect of transmittance. Accordingly, it is possible to know transmittance characteristics of a light flux based on the foregoing description.

In the embodiment, description is made based on an arrangement example, in which the imager is optically shifted in a direction i.e. Z-axis direction perpendicular to the optical axis of the refractive optical system 30. Alternatively, it is possible to prevent lowering of the transmittance of the refractive optical system 30 by disposing a phase plate in such a manner that the polarization direction of a light beam of a corresponding color is approximated to a shifting direction of a imager in the similar manner as described above, in the case where the imager is shifted in a horizontal direction i.e. X-axis direction, or an oblique direction.

For instance, in the case where the imager is disposed in such a manner that synthesized light is shifted in a horizontal direction i.e. X-axis direction with respect to the optical axis of the refractive optical system 30, the polarization directions of B beams and R beams among the synthesized light are aligned orthogonal to the shifting direction. In view of the above, a wavelength-selective half wavelength plate for rotating the polarization directions of B beams and R beams by 90° may be disposed between the dichroic prism 27 and the refractive optical system 30. Thereby, the polarization directions of B beams and R beams are aligned in the shifting direction, which enables to suppress lowering of the light amounts of B beams and R beams.

In the above description, the light beams of the respective colors are caused to be incident onto the refractive optical system 30 as linearly polarized beams i.e. P-polarized beams. Alternatively, the light beams of the respective colors may be incident onto the refractive optical system 30 as circularly polarized beams. The modification also provides an improved effect in suppressing color non-uniformity.

Figure 9:
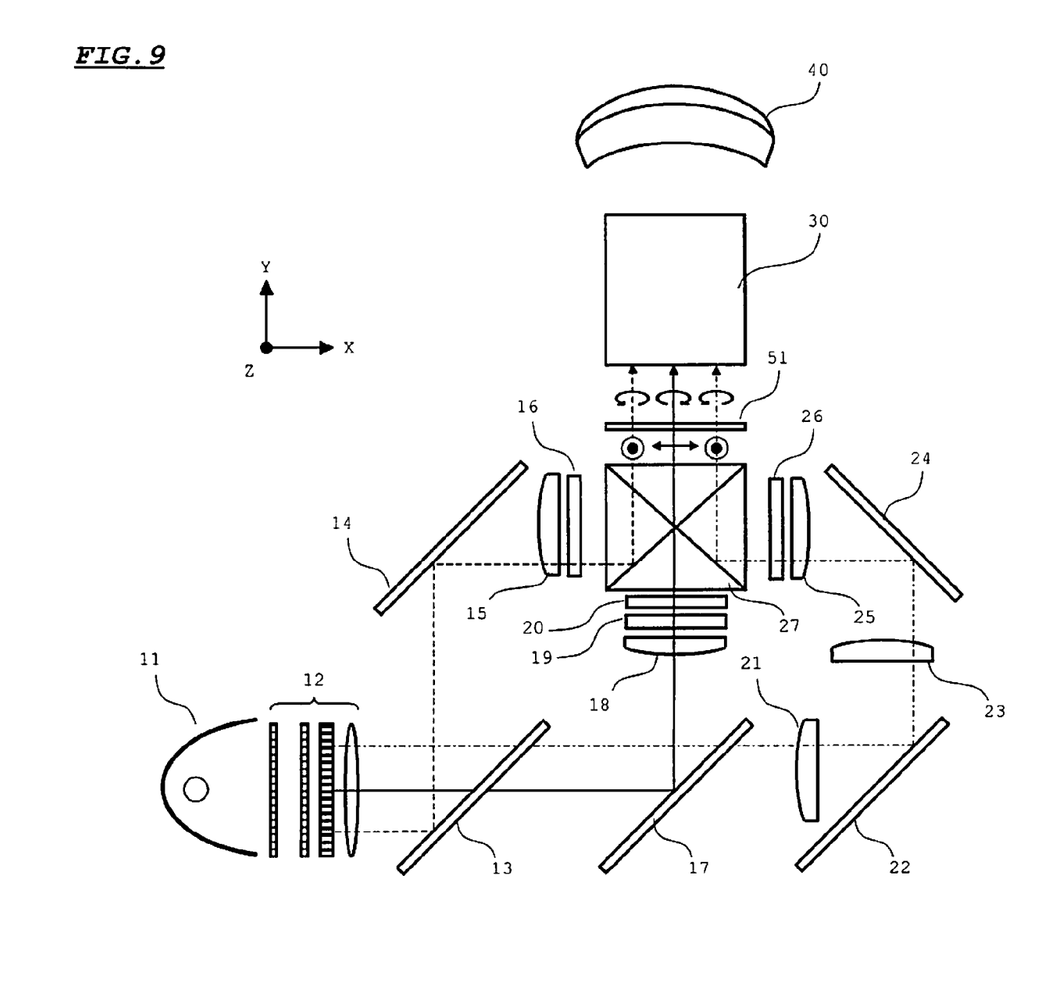
FIG. 9 is a diagram showing a modification of the optical system of the projector embodying the invention.

FIG. 9 shows an example of the aforementioned modification arrangement. In the arrangement example shown in FIG. 9, a quarter wavelength plate 51 is provided, in place of the wavelength-selective half wavelength plate 29 in the embodiment. B beams and R beams are converted into circularly polarized beams while transmitted through the quarter wavelength plate 51. G beams are converted into circularly polarized beams whose polarization direction is opposite to the polarization directions of the B beams and the R beams. As a result of the conversion, the light beams of the respective colors are incident onto the refractive optical system 30 as circularly polarized beams. In the above arrangement, it is conceived that the transmittance of the light beams of the respective colors in a range from the point A to the point B in FIG. 3 is substantially equal to about an average value of the transmittance of light beams to be incident onto the refractive optical system 30 as P-polarized beams, and the transmittance of light beams to be incident onto the refractive optical system 30 as S-polarized beams.

Figure 10:
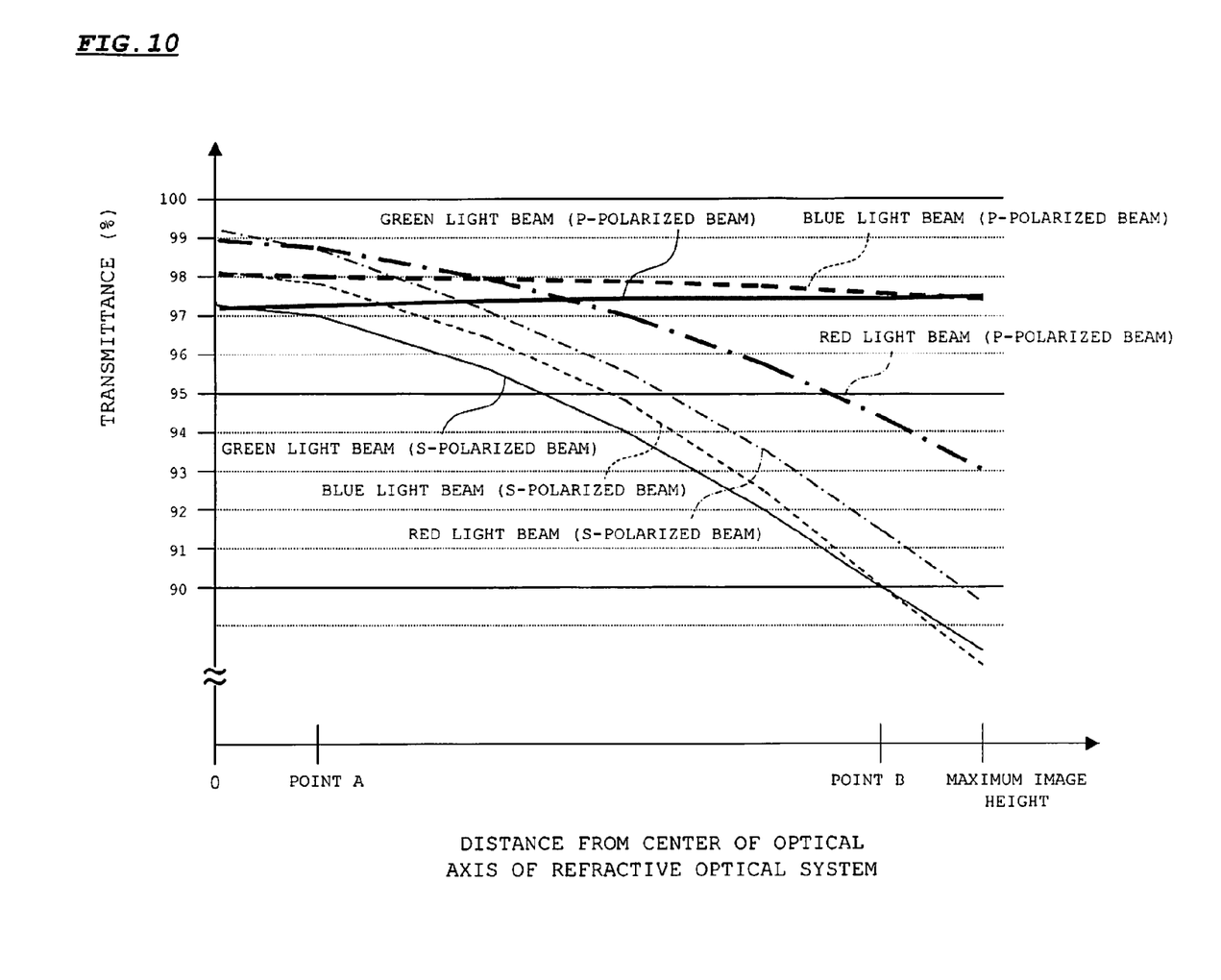
FIG. 10 is a graph for describing an effect of the projector embodying the invention.

FIG. 10 is a simulation graph showing relations between a distance from the optical axis of the refractive optical system 30 to a beam passing position on the line c-c' in FIG. 3 in the display plane of the imager 16 (19, 26), and a transmittance of light beams of the respective colors, in the case where B beams, G beams, and R beams are incident onto the refractive optical system 30 as P-polarized beams and S-polarized beams under the same condition as in FIG. 7.

In the simulation graph of FIG. 10, the transmittance of circularly polarized light beams of the respective colors passing through a range from the point A to the point B in FIG. 3 is substantially equal to about an average value of a transmittance of light beams to be incident onto the refraction optical system 30 as P-polarized beams, and a transmittance of light beams to be incident onto the refraction optical system 30 as S-polarized beams. Accordingly, as shown in the arrangement example in FIG. 9, by disposing the quarter wavelength plate 51 between the dichroic prism 27 and the refractive optical system 30, the transmittance of G beams is increased, although the transmittances of B beams and R beams are slightly lowered, as compared with the arrangement that the quarter wavelength plate is not disposed. As described above, in the current technology, the projection light amount of G beams is significantly larger than the projection light amounts of B beams and R beams among the B beams, the G beams, and the R beams. Accordingly, increasing the transmittance of G beams is advantageous in increasing an overall light amount of a projected image and suppressing color non-uniformity, despite slight lowering of transmittances of B beams and R beams.

The quarter wavelength plate is relatively inexpensive, as compared with a wavelength-selective half wavelength plate. Accordingly, using the quarter wavelength plate 51 as described in the arrangement example of FIG. 9, in place of the wavelength-selective half wavelength plate 29, contributes to reducing the cost of a projector.

Figure 11:
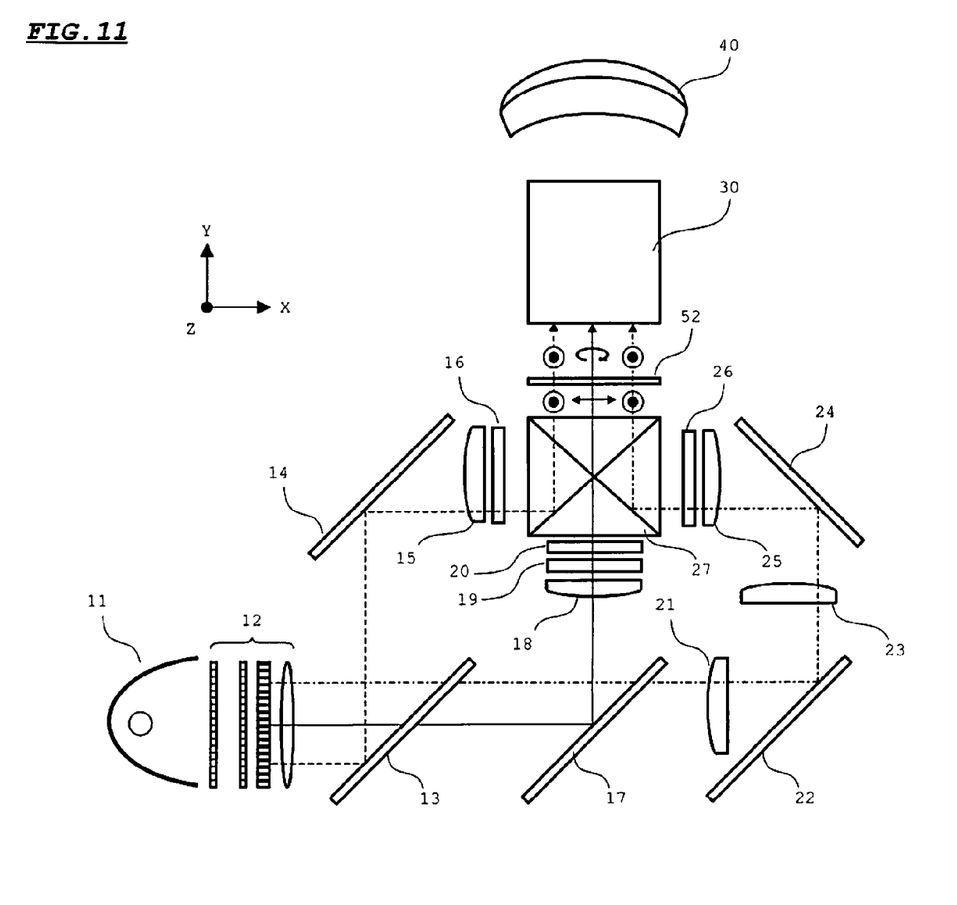
FIG. 11 is a diagram showing another modification of the optical system of the projector embodying the invention.

In the arrangement example of FIG. 9, all the B beams, the G beams, and the R beams are converted into circularly polarized beams for incidence onto the refractive optical system 30. Alternatively, merely the G beams may be converted into circularly polarized beams. FIG. 11 shows an example of the above modification arrangement. In the arrangement example shown in FIG. 11, a wavelength-selective quarter wavelength plate 52 acting exclusively on G beams is disposed between the dichroic prism 27 and the refractive optical system 30.

In the above modification, the transmittance of G beams in a range from the point A to the point B in FIG. 3 is substantially equal to about an average value of a transmittance of G beams to be incident onto the refractive optical system 30 as P-polarized beams, and a transmittance of G beams to be incident onto the refractive optical system 30 as S-polarized beams. Accordingly, the transmittance of G beams is improved, as compared with the arrangement that the wavelength-selective quarter wavelength plate 52 is not disposed. Also, since the B beams and the R beams are incident onto the refractive optical system 30 as P-polarized beams, there is no likelihood that the transmittances of B beams and R beams are lowered, as shown in the arrangement example of FIG. 9. Thus, the arrangement example of FIG. 11 enables to increase the transmittance of G beams while securing the transmittances of B beams and R beams, which is more advantageous in increasing the light amount of a projected image, and suppressing color non-uniformity, as compared with the arrangement example shown in FIG. 9.

While the embodiment of the present invention is described as above, the present invention is not limited to the foregoing embodiment, but may be modified in various ways other than the above.

For instance, in the embodiment, B beams, G beams, and R beams are modulated by imagers, and the modulated light beams are synthesized by a dichroic prism. Alternatively, light beams in a wavelength band other than the wavelength bands of the B beams, the G beams, and the R beams may be modulated by a corresponding imager, and the modulated light beams may be synthesized along with the B beams, the G beams, and the R beams for incidence onto the refractive optical system 30. For instance, in the case where light beams emitted from the lamp in the light source 11 includes a spectral component (hereinafter, called as "Y beams") in a wavelength band corresponding to yellow, in addition to B beams, G beams, and R beams, the Y beams may be guided to a corresponding imager for modulation, and the Y beams modulated by the corresponding imager may be synthesized along with the B beams, the G beams, and the R beams by a dichroic prism.

In the embodiment, transmissive imagers are used as elements for modulating light beams of the respective colors. Alternatively, the present invention may be applied to a projector incorporated with a reflective imager. Also, an arrangement other than the arrangement described in the embodiment may be applied according to needs, as to which plane of the dichroic prism 27 is to face the imager corresponding to a targeted color. For instance, the imager 16 for use in projection of B beams, and the imager 26 for use in projection of R beams in FIG. 1 may be exchanged to each other so that B beams may be incident onto the corresponding imager via the relay lenses 21 and 23.

In the embodiment, the present invention is applied to a projector for enlarging and projecting projection light by using an aspherical mirror. Alternatively, the present invention may be applied to a projector for enlarging and projecting projection light by using a wide-angle lens having a large angle of view as a projection optical system, in place of an aspherical mirror, according to needs.

In the arrangement example of FIG. 1, the fly-eye integrator is used as means for uniformizing light. Alternatively, a rod integrator may be used. It is to be understood that the embodiment of the present invention may be changed or modified in various ways, as far as such changes and modifications do not depart from the scope of the present invention hereinafter defined.

What is claimed is:

1. A projection display device, comprising:
   a light source;
   a plurality of imagers each arranged in correspondence to a light beam in a wavelength band to be modulated;
   a light synthesizing element for synthesizing the light beams in the wavelength bands modulated by the imagers;
   a first polarization regulating element for converting the light beam in one of the wavelength bands into a linearly polarized beam having a polarization direction orthogonal to a polarization direction of the light beam in the other wavelength band for incidence onto the light synthesizing element;
   a projection optical system for enlarging and projecting light synthesized by the light synthesizing element; and
   a second polarization regulating element disposed between the light synthesizing element and the projection optical system, wherein
   each of the imagers is disposed in a state that a center of the each imager is optically shifted with respect to an optical axis of the projection optical system, and
   the second polarization regulating element regulates the polarization direction of the light beam in a predetermined wavelength band among the light beams in the wavelength bands in such a manner that the polarization direction of the light beam in the predetermined wavelength band is approximated to a shifting direction of the center of the corresponding imager with respect to the optical axis of the projection optical system.

2. The projection display device of claim 1, wherein the second polarization regulating element is a half wavelength plate operative to selectively act on the light beam in the predetermined wavelength band.

3. A projection display device, comprising:
   a light source;
   a plurality of imagers each arranged in correspondence to a light beam in a wavelength band to be modulated;
   a light synthesizing element for synthesizing the light beams in the wavelength bands modulated by the imagers;
   a first polarization regulating element for converting the light beam in one of the wavelength bands into a linearly polarized beam having a polarization direction orthogonal to a polarization direction of the light beam in the other wavelength band for incidence onto the light synthesizing element;
   a projection optical system for enlarging and projecting light synthesized by the light synthesizing element; and
   a second polarization regulating element disposed between the light synthesizing element and the projection optical system, wherein
   each of the imagers is disposed in a state that a center of the each imager is optically shifted with respect to an optical axis of the projection optical system, and
   the second polarization regulating element regulates a polarization condition of the light beam in a predetermined wavelength band among the light beams in the wavelength bands in such a manner that the light beam in the predetermined wavelength band is converted into a circularly polarized beam.

4. The projection display device of claim 3, wherein the second polarization regulating element is a quarter wavelength plate operative to selectively act on the light beam in the predetermined wavelength band.

5. The projection display device of claim 3, wherein the second polarization regulating element is a quarter wavelength plate for converting each of the light beams in the wavelength bands into the circularly polarized beam.

* * * * *